3,201,082
CORROSION RESISTANT SEALING STRUCTURE
Raphael Rosen, Elizabeth, N.J., assignor, by mesne assignments, to the United States of America as represented by the United States Atomic Energy Commission
No Drawing. Filed Aug. 23, 1945, Ser. No. 612,199½
4 Claims. (Cl. 251—368)

This invention relates to structure for handling corrosive fluids and particularly to valves for controlling the flow of fluorine-containing fluids under high temperature and low pressure conditions.

In handling corrosive fluids, particularly fluorine-containing gases or corrosive vapors such as uranium hexafluoride, great difficulty has been found in providing leak-proof seals between sections of apparatus. This difficulty is especialy great in valve structures for handling corrosive vapors under high vacuum and high temperature conditions. Valve structure for high vacuum operations frequently includes a rubber valve seat, and under the conditions encountered in the passage of fluorine-containing mixtures or compounds it has been found that a rubber valve seat effective to give desired tightness when first installed, develops a hard crust on its surface within a relatively short time. Valves wherein the valve seats have developed this hard crust require a closure pressure on the valve seat so great that the rubber seats no longer serve their intended function.

It is an object of the present invention to provide structure, for the flow of corrosive fluids, having improved resistance to leakage.

It is a further object of the invention to provide apparatus, including a resilient sealing member, having an increased effective life in the handling of corrosive fluids.

It is another object to provide a valve, including a resilient closure member having increased effective sealing life, for controlling the flow or corrosive fluids exemplified by fluorine or fluorine releasing compounds such as uranium hexafluoride or mixtures of fluorine or fluorine-releasing compounds with other fluids.

In accordance with the present invention there is provided structure for flow of corrosive fluids having a greatly lengthened effective leak-proof life, comprising a pressure member and a resilient sealing of closure member cooperating therewith and comprising rubber or similar elastomer and a highly fluorinated organic compound. Particularly in valves or other structures wherein a resilient closure member is alternately exposed to corrosive gases for extended periods and then forced into sealing engagement with a cooperating metal member, it has been found that, employing the principles of the instant invention, the sealing effectiveness of the valve or other structure remains satisfactory for greatly increased periods under the corrosive action of the gases and the mechanical stress and wear to which the sealing member is subjected.

As resilient material for combination with highly fluorinated compounds in the sealing members of the structure of the instant invention, there may be used natural rubber either with or without fillers, but preferably not containing carbon black. Other resilient materials such as synthetic elastomers such as butyl rubber with or without carbon black filler may also be employed.

Agents for addition to the resilient compound to give this increased effective life of the structure include highly fluorinated, preferably substantially completely fluorinated e.g., perfluorinated hydrocarbons. Examples of suitable agents are: a compound of the formula $C_{21}F_{44}$, the products of highly fluorinating naphthenic type oils, e.g., fluorinated oils having a boiling 250 to 400° C. at 10 mm. of mercury pressure, polymerized fluorine-containing olefins such as polymerized trifluoromonochlorethylene (boiling range 150–350° C. at 0.15 mm. pressure), and polymerized heaxfluor butadiene. Other available compounds are highly fluorinated liquid oils resulting from the fluorination of vegetable oils, organic ethers, esters, ketones, etc. Still other addition agents which have been found especially satisfactory are waxy fluorine-containing materials, having a softening point at about room temperature, obtained as residue from the distillation of highly fluorinated hydrocarbon oils. In general, the addition agents which are to be associated with the resilient compound in accordance with the principles of the present invention are substantially completely fluorinated aliphatic compounds which have low vapor pressures under the conditions of use and which are composed chiefly of carbon and fluorine and contain no elements other than carbon, fluorine, chlorine and oxygen. It is important, however, that the materials have the properties possessed by the above compositions of "blooming" to the surfaces of the sealing member, and possess low vapor pressures under the temperature conditions at which they are to be used.

It appears that the addition agents give a combined protective and surface sealing action that effectively resists deterioration of the resilient material wtth which they are associated. It is to be understood, however, that other factors may be involved and that this explanation is only advanced as of possible assistance in understanding the invention.

The resilient member may be prepared by incorporating the protective addition agents in the rubber or other material by regular milling procedures used in the rubber industries. However, particularly where the addition agent is liquid or readily reduced to liquid condition, it has been found that, in many cases, resistance to deterioration can be secured by spraying or brushing the surfaces of the sealing member of the structure with the addition agent or by immersing the sealing member in a body of the agent.

The proportion of protective addition agent required varies with the agent selected. The proportion must not be so great as to destroy the resilience of the rubber or other material. On the other hand there must be sufficient agent to insure the necessary resistance to deterioration. Where the resilient member is sprayed or dipped in a fluorinated lubricating oil as the protective addition agent, it has been found that a thin continuous film over the surface will provide satisfactory resistance to deterioration and will retard loss of sealing power under the action of corrosive fluorine-containing gases or vapors for an extended period.

With other materials such as waxy protective agents, e.g., those obtained by polymerization of trifluoromonochlorethylene or hexafluorobutadiene and which may be milled into the resilient component, it has been found in general that higher percentages are desirable. With these waxy materials, it has been found that at least 5% of the protective agent is desirable to obtain a satisfactory resistant product and that as much as 15 to 20% based on the total rubber composition can be incorporated without adversely affecting the suitability of the composition in the structure of the instant invention.

The following illustrative examples are given to assist in a better understanding of the invention and are not to be construed as limiting the invention to the details and procedures given.

*Example 1*

A gas containing 5% of fluorine was passed at a temperature of 160° F. through a standard 4" two-port valve equipped with natural rubber valve seats. The natural rubber composition employed comprised 100 parts of pale crepe rubber, two parts of zinc oxide, two parts of sulfur, 0.375 part of "tuads" and 100 parts of blanc fixe. With the 4" standard valve a leak rate of less than 1 m.c.f.h. (microns per cubic foot per hour) through each valve seat was obtained at the beginning of the run with a sealing torque of 20 foot pounds applied to the valve stem. After opening the valve and passage of the gas therethrough for a period of 6 hours, it was found that with the same sealing pressure the leak rate through the valve was 170 m.c.f.h. through the right seat and 200 m.c.f.h. through the left seat. At a torque of 40 pounds, the leak rate for each seat was reduced to 70 m.c.f.h. At 60 foot pounds the leak rates were 24 and 16 m.c.f.h. for the right and left seat respectively; at 80 pounds the leakage was reduced to 12 m.c.f.h. and 8 m.c.f.h. for the right and left seat respectively, and at 100 foot pounds the leakage was reduced to 8.7 and 8.0 m.c.f.h. for the right seat and left seat respectively. However at 100 foot pounds sealing torque, the pressure of the valve head on the valve seat was such that a substantially metal to metal sealing contact was obtained.

Example 2

A standard 4" two-port valve including natural rubber valve seats was tested prior to use, and at a sealing torque of 20 foot pounds gave a leak rate of 3.4 m.c.f.h. through the left seat and 10 m.c.f.h. through the right seat. After exposure to flow of uranium hexafluoride vapors for 7 days at a temperature of 160° F., it was found that at a torque of 100 pounds the leak rate through the right seat was 212 m.c.f.h. and through the left seat, 85 m.c.f.h.

Example 3

In this example, there was employed a 4" two-port valve employing the principles of the present invention wherein the valve seats comprised a pressure member and a rubber base of the same composition employed in Example 1 having incorporated therein by milling 40 parts of fluorine-containing material having a boiling range of 150 to 250° C. at 0.15 mm. of mercury pressure which was obtained by the polymerization of trifluormonochlorethylene. Prior to the start of this run, it was found that at a torque of 10 pounds the leak rate was 0.3 m.c.f.h. through the right seat of the valve and 0.2 m.c.f.h. through the left seat of the valve. After passing a gas mixture identical with that employed according to Example 1, i.e., containing 5% fluorine, through the valve for a period of 14 hours at a temperature of 160° F., it was found that with a sealing torque of 10 foot pounds, the leak rate through the right seat of the valve was 0.3 m.c.f.h. and that there was no detectable leakage through the left seat of the valve.

Example 4

Through a valve employing the principles of the present invention, and similar to that employed in Example 3, there was passed uranium hexafluoride vapor at a temperature of 160° F. After a period of 87½ hours, it was found that a sealing torque of 20 foot pounds would seal the valve so that only 0.2 m.c.f.h. leaked through the right seat and 0.8 m.c.f.h. leaked through the left seat. After 178 hours of exposure to $UF_6$ vapors, and under the same sealing torque, the leak rate through the right seat was unchanged and there was no detectable leakage through the left seat. After a period of 319 hours and under the same sealing torque, the leak rate through the right seat of the valve was 1.8 m.c.f.h. and that through the left seat 14 m.c.f.h.

Example 5

Valve seats of the natural rubber composition described in Example 1 and shaped to fit a valve similar to that employed in Example 3 are maintained in contact was $C_{21}F_{44}$ at room temperature for 48 hours. The treated valve seats were put in place and the valve tested for leakage. The valve exhibited an initial leak rate of 1.4 m.c.f.h. with a sealing torque of 20 foot pounds. After exposure to a mixture of gases containing 5% fluorine: for 1 hour at 160° F., the following results were obtained: Torque foot pounds: Leak rate m.c.f.h.; whole assembly

| | |
|---|---|
| 20 | 45.9 |
| 40 | 10.2 |
| 60 | 6.1 |
| 80 | 3.7 |

Example 6

A highly fluorinated oil was prepared by dispersing lead naphthenate in a completely fluorinated solvent having a boiling point of above 350° C. and reacting the naphthenate with 30–40% of cobalt fluoride based on the weight of the naphthenate. The solvent was then distilled off and the highest boiling fraction of the residual oil, representing about 0.1% yield, was taken as product.

A valve, embodying the structure of the instant invention including a valve seat comprising rubber coated with the fluorinated oil product, exhibited a leak rate of 0.5 and 1.0 m.c.f.h. through right and left valve seats, respectively, with a torque of 20 foot pounds prior to starting the run. After passage of a gas mixture containing 5% fluorine through the valve for a period of 6 hours at a temperature of 160° F., the leak rates through the right and left valve seats were respectively, 1.8 and 1.5 m.c.f.h. This valve was then subjected to passage of uranium hexafluoride vapors at a temperature of 160° F. for a period of 24 hours and exhibited a leak rate of 1.4 m.c.f.h. for both seats under a sealing torque of 20 foot pounds after the run.

Example 7

A valve structure according to the present invention, including a rubber valve seat coated with a highly fluorinated waxy material left as residue from the distillation at 10 mm. pressure and up to 300° C. of the oil produced by polymerization of trifluormonochlorethylene, exhibited a leak rate prior to commencing the run of 1.7 and 1.4 m.c.f.h. through the right and left valve seats, respectively. After passage of a gas mixture containing 5% fluorine at a temperature of 160° F. for 3 hours, the leak rates through the right and left seats at a sealing torque of 10 foot pounds were, respectively, 2.04 and 2.73 m.c.f.h. After 6 hours and under the same sealing torque, the leak rates were respectively 28.9 and 10.2 m.c.f.h. and after 24 hours the leak rates were 13.6 and 459 m.c.f.h. By increasing the sealing torque to 20 foot pounds, the leak rates were reduced respectively to 3.4 and 51.0. When this embodiment of the invention was tested in the passage of uranium hexafluoride vapors at 160° F., it was found that the leak rates with 10 foot pounds sealing torque for the right and left valve seats were, respectively, 11.5 and 390. By increasing the torque to 20 foot pounds these rates were reduced to 6.8 and 305 m.c.f.h. respectively. After 147 hours of treatment and at 20 foot pounds of torque sealing pressure, the leak rates were respectively 28 and 170 m.c.f.h. After 221 hours and at a sealing torque of 20 foot pounds, the leak rates were respectively 33.2 and 193 m.c.f.h.

Although the invention has been described particularly in its application to valve structure and is of special utility in this relation, it will be understood that the principles of invention are applicable to other problems where resilient sealing members are interposed between sections of an apparatus. Examples of such use are resilient sealing gaskets between conduit sections, or packing around valve stems of apparatus which may be subjected to corrosive gases. Also, although the invention has been found to have particular utility in apparatus for handling fluorine or free or combined fluorine containing gas and vapor mixtures it may also be of advantage in handling other fluids.

As many embodiments of this invention may be made without departing from the spirit thereof, it is to be understood that the invention is not limited to the theory of operation, specific disclosure, or embodiments, but includes all subject matter which may be held to come within the scope of the appended claims.

I claim:

1. In apparatus resistant to deterioration during the passage of fluorine-containing corrosive fluids, a metal pressure member and a cooperating resilient sealing member comprising rubber having incorporated therein a substantially completely fluorinated aliphatic compound having a low vapor pressure under the conditions of use and composed chiefly of carbon and fluorine and containing no elements other than carbon, fluorine, chlorine and oxygen.

2. A valve resistant to loss of sealing effectiveness under the action of corrosive fluids comprising a metal pressure member and a cooperating resilient valve closure member said closure member comprising an elastomer having incorporated therein a substantially completely fluorinated aliphatic compound, said fluorinated compound having a low vapor pressure under the conditions of use and composed chiefly of carbon and fluorine and containing no elements other than carbon, fluorine, chlorine and oxygen.

3. A valve resistant to loss of sealing effectiveness under the action of fluorine-containing corrosive fluids at high temperatures and high vacuum comprising a metal pressure member and a cooperating resilient closure member, said closure member comprising rubber having incorporated therein at least 5% of a substantially completely fluorinated aliphatic compound having a low vapor pressure under the conditions of use and composed chiefly of carbon and fluorine and containing no elements other than carbon, fluorine, chlorine and oxygen.

4. A valve resistant to loss of sealing effectiveness under the action of fluorine-containing corrosive fluids comprising a metal pressure member and a cooperating resilient closure member, said closure member comprising rubber and polymerized trifluoromonochlorethylene having a boiling range of from about 150° to about 350° C. at 0.15 mm. pressure.

References Cited by the Examiner
UNITED STATES PATENTS

| | | | |
|---|---|---|---|
| 1,810,560 | 6/31 | Garvey. | |
| 1,822,253 | 9/31 | Vivas | 260—757 |
| 1,912,786 | 6/33 | Moe | 251—158 X |
| 2,129,289 | 9/38 | Soll | 260—772 |
| 2,186,917 | 1/40 | Gaylor. | |
| 2,215,704 | 9/40 | Ladd et al. | 117—118 X |
| 2,293,266 | 8/42 | Mitchell | 117—66 |

FOREIGN PATENTS 796,026   3/36   France.

M. CARY NELSON, *Primary Examiner.*

CARL F. KRAFFT, F. I. WHITNEY, JAMES L. BREWRINK, *Examiners.*